United States Patent
Richardson

(10) Patent No.: US 7,568,630 B2
(45) Date of Patent: Aug. 4, 2009

(54) RF TAG AND RF TAGGING SYSTEM

(75) Inventor: Christopher Keith Richardson, Romsey (GB)

(73) Assignee: Roke Manor Research Limited, Romsey (GB)

( * ) Notice: Subject to any disclaimer, the term of this patent is extended or adjusted under 35 U.S.C. 154(b) by 424 days.

(21) Appl. No.: 10/489,354

(22) PCT Filed: Sep. 16, 2002

(86) PCT No.: PCT/EP02/10426

§ 371 (c)(1),
(2), (4) Date: Oct. 4, 2004

(87) PCT Pub. No.: WO03/025831

PCT Pub. Date: Mar. 27, 2003

(65) Prior Publication Data

US 2005/0029359 A1    Feb. 10, 2005

(30) Foreign Application Priority Data

Sep. 14, 2001  (GB) ................. 0122236.3
Apr. 5, 2002   (GB) ................. 0207903.6

(51) Int. Cl.
  *G06K 19/06* (2006.01)
(52) U.S. Cl. .................. 235/492; 235/375; 235/380
(58) Field of Classification Search ........... 235/375, 235/380, 385, 435, 492; 340/572.1, 551, 340/539.1, 825.71, 825.72
See application file for complete search history.

(56) References Cited

U.S. PATENT DOCUMENTS

| 5,461,386 | A |  | 10/1995 | Knebelkamp |  |
|---|---|---|---|---|---|
| 5,667,924 | A |  | 9/1997 | Ziolo |  |
| 5,717,382 | A |  | 2/1998 | Cooper |  |
| 5,825,290 | A | * | 10/1998 | Lian et al. ................. | 340/572.6 |
| 5,838,253 | A | * | 11/1998 | Wurz et al. ............... | 340/10.42 |
| 5,963,134 | A | * | 10/1999 | Bowers et al. ........... | 340/572.1 |
| 6,130,612 | A |  | 10/2000 | Castellano et al. |  |
| 6,198,875 | B1 |  | 3/2001 | Edenson et al. |  |
| 6,204,248 | B1 |  | 3/2001 | Demopoulos et al. |  |
| 6,229,445 | B1 | * | 5/2001 | Wack ....................... | 340/572.7 |
| 6,243,022 | B1 | * | 6/2001 | Furukawa ............... | 340/825.72 |
| 6,325,294 | B2 | * | 12/2001 | Tuttle et al. ................. | 235/492 |
| 6,371,375 | B1 | * | 4/2002 | Ackley et al. .......... | 235/462.45 |

FOREIGN PATENT DOCUMENTS

| EP | 0340034 A2 | 4/1989 |
|---|---|---|
| GB | 2312511 A | 4/1996 |
| WO | WO 99/36798 A2 | 1/1999 |

OTHER PUBLICATIONS

International Search Report.
British Search Report.

* cited by examiner

*Primary Examiner*—Kumiko C Koyama
(74) *Attorney, Agent, or Firm*—Crowell & Moring LLP

(57) ABSTRACT

An RFID tag includes a plastic container having at least one particle that is disposed therein and that is formed from metal or metal coated and/or fabricated from a plurality of different metals. A receiver unit detects RF pulses which are generated by the Triboelectric effect of the particles.

9 Claims, 1 Drawing Sheet

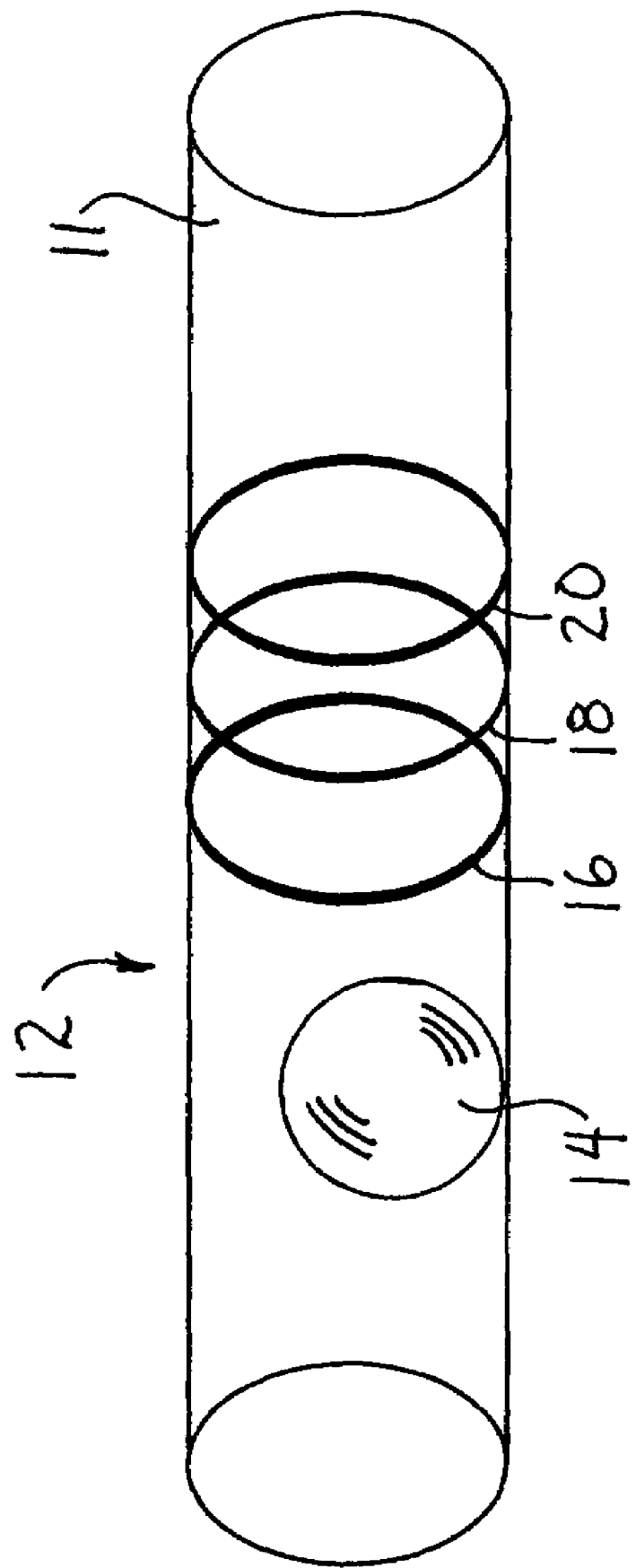

RF TAG AND RF TAGGING SYSTEM

BACKGROUND OF THE INVENTION

There are many examples of tags. In recent years electronic tags have been developed which store data and from which data can be retrieved by way of radio frequency (RF) or capacitive interrogation. These so-called smart tags are sophisticated often having their own energy supply or a means for deriving energy from an interrogator usually by way of inductive or capacitive coupling. Such smart tags are extremely effective at performing their intended purpose, but they are complex and expensive.

According to the first aspect of the invention there is provided a tag comprising: a container, in which there is at least one particle, arranged to be displaced with respect to the container so that a radio frequency (RF) signature is emitted; said RF signature being capable of identifying the tag The generation of electric charge by contact between two surfaces is known as the Triboelectric effect. The static charge is not caused directly by friction but by adhesion between two surfaces at molecular level. Surfaces stick together because chemical bonds form. When surfaces in contact separate these bonds rupture and any asymmetrical bonds tend to leave a charger imbalance due to an interchange of electrons between the surfaces.

The inventors have determined that use can be made of this effect to provide a tagging system, which is very sensitive to movement.

The tag described herein allows for a very low cost and simple means to apply tagging. Specifically it provides a cheap and simple means to generate a tagging signal. The invention will now be described in more detail.

SUMMARY OF THE INVENTION

In general the invention takes the form of a number of metal particles placed in a plastic container, such as a synthetic plastics bag, envelope or other capsule for example. When displaced with respect to one another very short pulses of electromagnetic energy at radio frequencies are produced. The pulse width is very small and is typically less than a nanosecond (1 ns) in duration. Typically the amplitude of the pulse (spike) is of the order of a few hundred milliwatts ERP.

Pulses are generated for example by having a static charge build up on individual particles as they move over a synthetic plastic surfaces. Because the movement in different parts of the bag varies, there is a significant difference between electric charge on individual particles. This difference abruptly reduces to zero when they touch. This rapid voltage step generates electromagnetic pulses.

A passive tag may be provided for example by the use of a miniature synthetic plastics capsule or pill containing metal particles. Pulses generated can be detected using a wideband receiver with a bandwidth in the order of 1 GHz.

Preferably the receiver has a detector which is capable of detecting pulse signals with a rise time of around 1 nanosecond.

Various applications of such tags are envisaged. These include applications in goods or other articles. In a system using the tag for example, an alarm is triggered in the event that articles are removed from a shop without authorisation (ie., without removing the tag). Other applications may include tagging of valuable articles; and tagging of humans and tagging of animals.

There are a number of different forms or materials from which the tags may be fabricated. For example, they may be manufactured as a blister pack with each tag being of the order of a few millimeters in the form of a cube. The container is ideally formed from a synthetic plastics material and the particles include a conductive material such as metal particle. Although metal particles are preferred the invention is not limited to this but other conducting materials such as carbon may also be used.

The tags may also contain particles of a variety of different materials conductive and non-conductive materials of differing particle size. In this way tags are capable of providing a different pulse signature which is individual to each tag and thus detection of these would differentiate one tag from another.

This provides tags suitable for verification purposes. Thus, for example, an envelope or container having a number of particles, the nature or characteristics of pulses emitted may be related to the number of particles.

Because pulses generated are of very narrow width (duration) it is possible to locate the tag accurately by measuring the time of arrival of the pulses using two or more suitably spaced detectors.

Other objects, advantages and novel features of the present invention will become apparent from the following detailed description of the invention when considered in conjunction with the accompanying drawings.

BRIEF DESCRIPTION OF THE DRAWINGS

The single FIGURE illustrates a tag according to an embodiment of the invention.

DETAILED DESCRIPTION OF THE INVENTION

In one particular preferred embodiment of the invention, shown in the FIGURE, a tag includes a container 12 formed from a synthetic plastics tube 11 within which there is a metal particle in the form of a sphere 14. The tube 11 has a series of metallic strips 16, 18 and 20 in the form of rings disposed on the surface of the container 12. As the sphere 14 rolls along the tube 11 a series of RF pulses are emitted. The quantity and width of the strips determine the pulse train. Such an embodiment allows for differentiation of one tag from another tag.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A tag comprising:
   radio frequency RF means for generating a radio frequency signature that identifies the tag;
   wherein said RF means comprises,
   a container; and
   at least one first element disposed within said container and displaceable relative to said container; wherein,
   displacement of said first element within said container generates said radio frequency signature;
   said container comprises a plurality of second elements fixedly disposed along a path within said container; and
   movement of said at least one first element along said path generates a series of RF pulses as a function of at least quantity and width of said second elements, which RF pulses identify the RF tag.

2. The tag as claimed in claim 1, comprising a plurality of first elements.

3. The tag as claimed in claim 1, wherein at least one of said at least one first element is metal or metal coated.

4. The tag as claimed in claim 3, wherein the at least one metal or metal coated first element is fabricated from a plurality of different metals.

5. The tag according to claim 1, wherein said plurality of second elements comprises at least two metallic strips disposed on a surface of the container arranged to detect displacement of the at least one first element.

6. The tag according to claim 5, wherein the relative location and/or dimension and/or number of strips on a tag is unique, thereby providing a unique RF signature upon displacement of the at least one particle.

7. The tag according to claim 1, wherein:
said container comprises a tube;
said at least one first element comprises a metallic sphere which is free to roll along said path; and
said second elements comprise metallic rings disposed in a surface of said tube, about said path;
whereby said sphere rolls past said rings sequentially as it moves along said path, thereby generating said pulses.

8. A radio frequency RF tag, comprising:
a container; and
at least one first element disposed within the container and being free to move within said container; wherein
movement of said at least one first element within the container causes a contact between surfaces within the container, which contact, when broken, generates an RF signal due to the Triboelectric effect; and
said RF signal is a function of configuration of said container and of said at least one first element, and identifies said tag.

9. An RF tag according to claim 8, wherein said contact comprises at least one of i) contact between surfaces of respective ones of said at least one first element, and ii) contact between at least a surface of said at least one first element and a surface of at least one second element that is fixedly arranged along a movement path of said at least one first element within the container.

* * * * *

UNITED STATES PATENT AND TRADEMARK OFFICE
CERTIFICATE OF CORRECTION

PATENT NO. : 7,568,630 B2 Page 1 of 1
APPLICATION NO. : 10/489354
DATED : August 4, 2009
INVENTOR(S) : Christopher Keith Richardson It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 184 days.

Signed and Sealed this

Seventh Day of September, 2010

David J. Kappos
*Director of the United States Patent and Trademark Office*